United States Patent Office 3,052,727
Patented Sept. 4, 1962

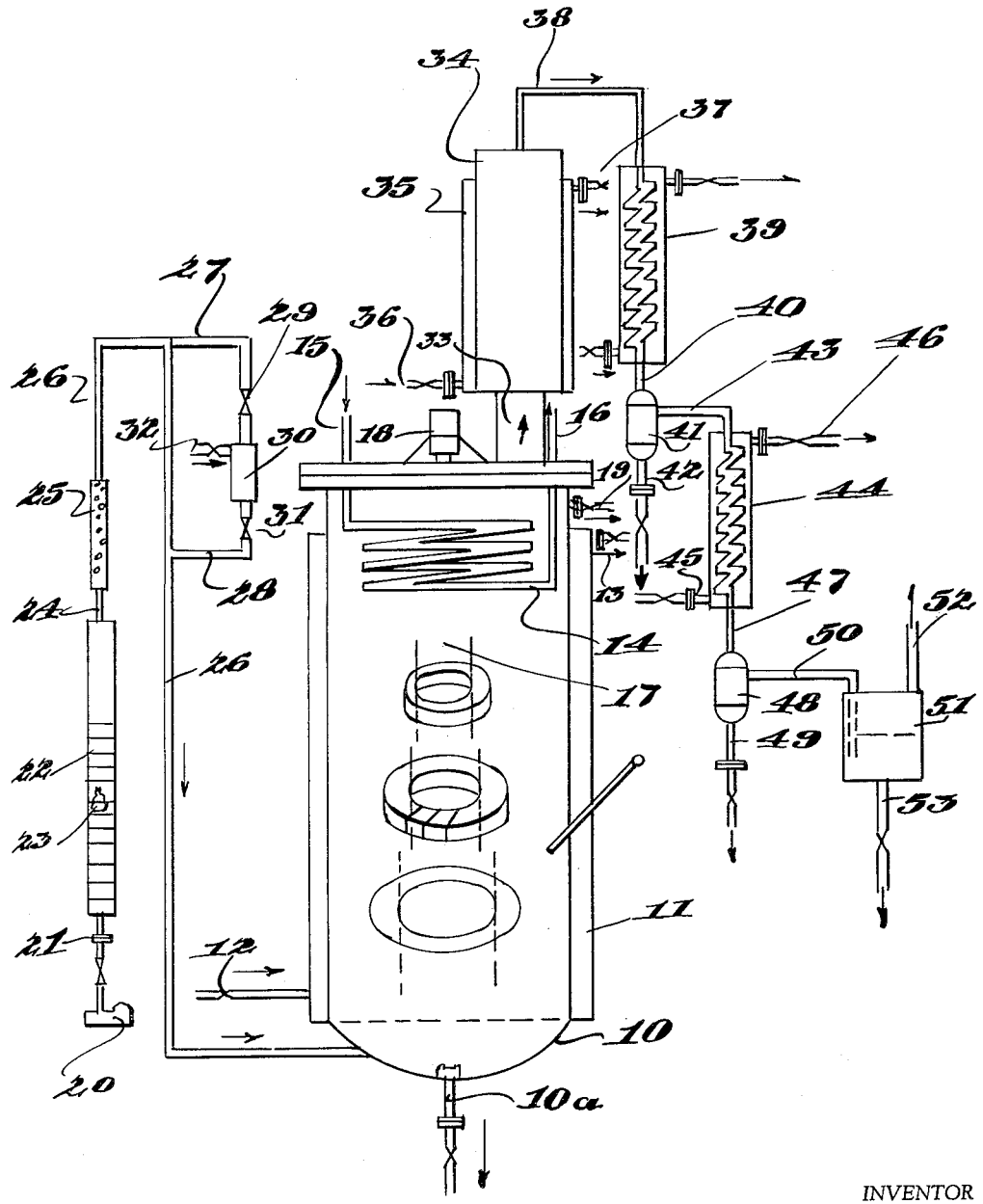

3,052,727
OXIDATION OF PETROLEUM DISTILLATES TO OBTAIN HIGHER CRYSTALLIZED ETHERS, AND HIGHER LIQUID ETHERS
Henri Huber, Mexico City, Mexico, assignor to Resources Research, Inc., Washington, D.C., a corporation of Maryland
Filed Aug. 17, 1959, Ser. No. 834,214
10 Claims. (Cl. 260—614)

The present invention relates to the preparation of certain ethers and more particularly to the preparation of higher aliphatic ethers by the catalytic liquid phase oxidation of petroleum derivatives containing certain aliphatic hydrocarbon constituents therein.

It has been known heretofore that ethers may be derived from hydrocarbons by addition of water thereto. However, such an operation, in order to function satisfactorily, must employ an unsaturated aliphatic hydrocarbon such as, for example, an olefin or a material containing such constituents, as the starting material. Such an operation may be illustrated by the following:

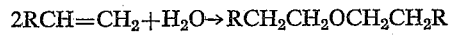

However, it has been impossible heretofore to prepare ethers from saturated aliphatic hydrocarbons or materials containing such hydrocarbons as constituents therein. The present invention is based upon the discovery that it is possible to produce ethers in commercial quantities and of a commercial purity by a controlled oxidation of materials containing saturated aliphatic hydrocarbons. Such a reaction may be expressed by the following:

The oxidation of petroleum derivatives is, in general, quite old. However, such oxidation has been primarily for the production of fatty acids. Fatty acids ranging from formic acid up to capric acid have been made of industrial purity by the oxidation of petroleum derivatives. Basically, this type of operation consists in oxidizing the selected petroleum derivative, such as, a petroleum distillate, distilling the resulting oxidized material and then fractionating the distillate, to recover the desired fatty acid. In such an operation, the residue remaining contains the higher fatty acids, hydroxy-acids, keto-acids, esters, lactones, alcohols, ethers, and ketones. However, it is virtually impossible to separate or recover such compounds individually of good color and purity and in an amount that would render such recovery economically feasible. As a result, the prior oxidation of petroleum derivatives has resulted only in the production of fatty acid containing up to about ten carbon atoms per molecule with the remaining material of the reaction being discarded.

It is therefore a principal object of the present invention to prepare ethers in a new and novel manner.

Another object of the present invention is the preparation of ethers from materials which have heretofore not been employed for same.

A further object of the present invention is the preparation of ethers from materials containing saturated aliphatic hydrocarbons as constituents therein.

Yet another object of the present invention is the preparation of certain aliphatic ethers from petroleum derivatives.

Still another object of the present invention is the preparation of certain aliphatic ethers by the catalytic oxidation of petroleum distillates containing saturated aliphatic hydrocarbons as constituents therein.

Another object of the present invention is the production of new and novel ether products.

A further object of the present invention is production of various ether products having different physical properties.

A still further object of the present invention is the production of higher aliphatic ethers containing a large number of carbon atoms per molecule.

Yet another object of the present invention is the preparation of certain aliphatic ethers as well as fatty acids from petroleum derivatives by the oxidation thereof.

Another object of the present invention is the production of pure white crystallized ethers and liquid colorless ethers in good yields from petroleum distillates by catalytic oxidation thereof in the liquid phase.

Other and additional objects will become manifest from the ensuing description.

Broadly stated, the present invention is directed to the preparation of higher aliphatic ethers which comprises reacting a gaseous oxidizing medium with a petroleum derivative in the presence of a catalyst at a pressure and temperature and for a period of time sufficient to effect the formation of aliphatic ethers therein, and recovering the ethers from the oxidized derivative.

To the accomplishment of the foregoing and related ends, the present invention then consists of the means hereinafter fully described and particularly pointed out in the claims, the annexed drawing and the following description setting forth in detail certain means in the carrying out of the invention, such disclosed means illustrating, however, but one of various ways in which the principal of the invention may be employed.

The present invention is illustrated, by way of example, in the accompanying drawings, in which:

FIG. 1 is a side elevation of one form of apparatus that may be employed in producing ethers in accordance with the present invention.

The starting material to be employed in the present invention may be any petroleum derivative having a large amount of saturated aliphatic hydrocarbons as components thereof. Any petroleum derivative that can be treated to impart thereto a large amount of saturated aliphatic hydrocarbons as components therein may likewise be employed. The preferred compounds to be employed as starting materials in the present invention are petroleum distillates such as, for example, light gas oil, heavy gas oil, kerosenes, etc.

The particular petroleum distillate employed as a starting material in the present invention will result in ethers having varying physical properties. For example, when a light or heavy gas oil is oxidized and subsequently treated in accordance with the present invention, the resulting product consists of higher aliphatic ethers or mixtures thereof that are white crystals in physical form which will possess a melting point varying from between about 20° C. to about 50° C. Ethers that are colorless and in liquid form may be made in accordance with the present invention by employing kerosene as the starting material. When the kerosene has been oxidized in accordance with the present invention to form ethers in a crystalline state, the resulting product existing in crystalline form is then fractionated thereby producing ethers in a liquid state.

To achieve good yields of the ultimate end product and to enhance the oxidation rate of the petroleum distillate, it will be found advantageous to refine or otherwise treat the petroleum distillate prior to subjecting same to the oxidation treatment. One such method of treatment may be the well known white oil process. In this operation the petroleum distillate is subjected to a mineral acid such as, for example, sulphuric acid. The acid treated distillate is then subjected to an extraction operation with an alcohol, such as, for example, methyl alcohol or isopropyl alcohol. The extracted petroleum distillate is then passed through clay and is then ready for the oxidation operation and subsequent treatment thereof to produce the desired ethers.

Another pre-treatment method of the starting material which has been found to be quite beneficial and which results in very pure raw materials is to treat the petroleum distillate with a mineral acid in the manner just described. Following the acid treatment the distillate is then extracted with an aqueous urea solution producing a complex urea-hydrocarbon material in crystalline form. The complex urea-hydrocarbon crystals are then subjected to a water treatment resulting in mixtures of normal saturated aliphatic hydrocarbons and alkyl naphthenes.

Another method that has been found to be of particular utility in the present invention and which enriches the petroleum distillate with normal saturated aliphatic hydrocarbons is one in which the distillate is percolated through a bed of silica gel, at an elevated temperature. The resulting percolate is then cooled and filtered, with the crystals remaining on the filter consisting principally of normally saturated aliphatic hydrocarbons.

To effect the proper oxidation of the petroleum distillates to produce the desired ethers in accordance with the present invention, a catalyst must be employed. The catalyst to be employed in the oxidizing operation may be any soluble inorganic salts or hydroxides of various metals. Examples of such metals or hydroxides found to be of particular utility in the present invention are manganese chloride, manganese sulphates, manganese hydroxide, calcium chloride, calcium sulphate, calcium hydroxide, aluminum chloride, aluminum sulphate, aluminum hydroxide, zinc chloride, zinc sulphate, zinc hydroxide, iron chloride, iron sulphate, iron hydroxide, nickel chloride, nickel sulphate, nickel hydroxide, chromium chloride, chromium sulphate, chromium hydroxide, copper chloride, copper sulphate, copper hydroxide, molybdenum chloride, molybdenum sulphate, molybdenum hydroxide, tungsten chloride, tungsten sulphate, tungsten hydroxide, etc. Of the foregoing catalysts, the ones particularly preferred are manganese chloride, manganese sulphate, or manganese hydroxide.

The organic salts of such metals, such as for example, manganese naphthenate or manganese stearate, when employed as a catalyst in the oxidation of petroleum distillates tend to form principally fatty acid products. Manganese acetate when employed as a catalyst in the oxidation operation of petroleum distillates in accordance with the present invention has been found to result in the formation of fair quantities of ether but in no way to the extent in which such ethers are produced employing the inorganic metallic sulphates.

The catalyst is added to the oxidation operation in the form of an aqueous solution with one gram of the metal in the form of an inorganic salt being employed to 20 milograms of water being preferred. The aqueous solution of the catalyst is added continuously to the oxidation operation until the oxidation is completed. The concentration of the catalyst employed will generally be in the range of 0.03 to 2 grams of metal in the form of its metallic salt per hour per 100 grams of raw material during the 4 to 12 hours which is the time normally required to complete the oxidation of the petroleum distillate.

To effect the oxidation, oxygen or any oxygen-bearing gas which will not otherwise deleteriously affect the petroleum distillate may be employed. Air is the preferred material to be used from a standpoint of economy. Ozone or ozonized air has been found to speed up the oxidation reaction, but the use of this material increases the cost of the economic operation of the system.

The conditions to be employed in the oxidation of the petroleum distillate are important to effect a good yield of the desired ethers. The temperature to be employed in effecting the oxidation of the petroleum distillate is in the range of between about 80° C. to about 150° C. The preferred range at which the best color and yield of the desired product is obtained is about 115° C. to 120° C.

If speed is important in effecting the oxidation of the petroleum distillate, higher temperatures up to about 150° C. may be employed, but such an operating temperature gives a lower yield of the desired ethers. The oxidizing operation of the petroleum distillate may be effected at a pressure in the range of 20 mm. Hg to 100 p.s.i. However, the preferred pressure will be found to be about 580 mm. pressure. In general, the time required to effect the desired oxidation of the petroleum distillate in accordance with the present invention will be found to be between 4 to 12 hours. However, if the temperature employed is between 80° and 100° C., the time required to effect the oxidation will range up to 24 hours.

After the oxidation of the petroleum distillate has been effected, the oxidized mass is then cooled to between 0° C. and −20° C. after which the cooled material is then filtered. The resulting filtered cake is almost white and is purified further by subjecting same either to a recrystallization operation or by refining with a small quantity of mineral acid, such as, for example, sulphuric acid, after which the acid treated material is filtered through charcoal. The resulting products are in the form of a mixture of higher aliphatic ethers that are white crystals and will possess a melting point between about 20° C. to 50° C., depending upon the starting material employed. The ethers may be obtained in liquid form, as hereinbefore indicated, by employing a kerosene as the starting material and fractionating the crystal products recovered in the temperature range of 0° C. to −20° C. In the event, at the completion of the oxidation, the resulting oxidized product is in an acid state, it will be found advantageous to extract the acids and otherwise neutralize the product by saponifying the oxidized product with caustic soda and then subjecting the cooled unsaponified residue to the filtering operation between 0° C. and −20° C., which will produce the desired ether product. It is to be clearly understood, however, that filtration can be carried out satisfactorily in an acid state. While the broad cooling range is 0° C. to −20° C., the preferred range is 0° to −10° C.

Why the production of ethers in accordance with the present invention occurs is not definitely known. It is known that ethers may be prepared as a result of the dehydration of two molecules of alcohol. Thus, in accordance with the present invention, di-aliphatic ethers are formed or if made from two alcohols containing different numbers of carbon atoms, the resulting ethers contain the sum of the carbon atoms of the two alcohols. This is borne out by the fact that when gas oil containing an average of 20 carbon atoms is employed as the petroleum distillate, the resulting aliphatic ethers will contain 34 to 40 carbon atoms. Thus, it is possible that the ethers are produced in the present invention as a result of the transitional formation of alcohols followed by the hydrolysis thereof to the ethers. It is to be clearly understood that this is theoretical only since it has been impossible to separate aliphatic alcohols as a functional group during the reaction. It is possible that in the oxidation of the petroleum distillate the reaction occurs with two molecules of saturated aliphatic hydrocarbons converting to one molecule of di-alphatic ether and one molecule of water, with the dehydration of alcohols proceeding at a much faster rate than the formation of alcohols from the hydrocarbons.

FIGURE 1 illustrates an apparatus arrangement that has been found to be of particular utility in carrying out the present invention. As illustrated, the apparatus comprises a closed reactor vessel 10 which may be made of any suitable material although the preferred material is aluminum. The reactor 10 is provided with a steam jacket 11 which is employed to heat up the feedstock charge to the desired reaction temperature. The steam may be obtained from any suitable source (not shown) and passes into the lower end of the steam jacket 11 through valved line 12, with the spent or cooled steam passing outwardly through valved line 13 positioned at the top of the jacket 11. The upper area of the reactor 10 is provided with a continuous cooling coil 14 having a cold water inlet at line 15 and a water discharge outlet through line 16. The cooling coil 14 serves to maintain the temperature of the reactor during the exothermic phase of the oxidation reaction by having water continuously passed through the cooling coils 14. A turbomixer 17 is mounted within the reactor 10 in vertical alignment therewith for high speed rotation therein. The turbomixer 17 is driven by an electric motor 18 mounted on the top cover of the reactor 10. A valved discharge line 10a is provided at the bottom of the reactor 10.

The reactor 10 is provided with a valved inlet line 19 extending thereinto just above the top of the steam jacket 11 through which the petroleum distillate to be used as a feedstock will be fed. The air or other gaseous medium to be used as the oxidizing agent is fed from a compressor 20 through valved line 21 into a rotometer 22 provided with a float 23 which will indicate the amount of air passing into the system. The rotometer 22 is connected by line 24 to an air drying tube 25 filled with calcium chloride or the like which will serve to remove any moisture contained in the air or other gaseous medium. The outlet end of the drying tube 25 is connected by line 26 to the bottom of the reactor 10 for passing the air into the reactor countercurrent to the direction of the feedstock. The air line 26 is provided with spaced by-pass lines 27 and 28 which function as means to carry the catalyst either in a dissolved state or a fluid suspended state into the air stream prior to reaching the reactor 10. The by-pass line 27 is provided with a valve 29 and is connected on one side to the air line 26 and on the other side to a catalyst container 30 which contains a catalyst either dissolved in water or similar fluid or is in a suspended state in the fluid. The opposite end of the catalyst chamber 30 is connected to one end of line 28 with the opposite end of line 28 being connected to the air line 26. The by-pass line 28 is likewise provided with a valve 31 which in conjunction with the valve 29 in line 27 either admits or prevents the entry of catalyst into the air stream. The catalyst chamber 30 is provided with a valve line 32 which permits the entry of catalyst as needed into the catalyst chamber 30. To admit the catalyst to the reactor 10 the valve 32 is in a closed state and valve 29 is fully open permitting the air to pass through line 26 into the catalyst chamber 30. The valve 31 in line 28 which is connected to air line 26 is regulated to admit the catalyst in the air stream slowly into the reactor 10.

The top of the reactor 10 is provided with a large outlet line 33 through which spent air, water vapors, light oil vapors, volatile acids and the like will pass therefrom. The opposite end of the discharge line 33 is connected to a foam breaker vessel 34 which is provided with a steam jacket 35 to maintain the temperature in the foam breaker above 100° C. The heat of the steam jacket 35 is maintained by passing steam through valved inlet line 36 connected to the steam jacket 35 and out through the valved outlet discharge line 37. The top of the foam breaker 34 is provided with a discharge line 38 which extends into a cooling tower 39 where the light oil and water containing formic and acetic acid is condensed. The resulting condensate passes through line 40 into the storage vessel 41 where the material is periodically removed through valved line 42. The oil may be recovered if desired and returned to the reactor 10 through the discharge inlet line 19. The remaining vapors that have passed with the condensate into the vessel 41 passed through the over heated line 43 into a second cooling tower 44 which is maintained at about a temperature of −10° C. by cold brine entering through inlet line 45 and out through outlet line 46. Additional formic and acetic acid and water is condensed in the cooling tower 44 and passes through line 47 into the storage vessel 48 and may be periodically drained therefrom by valved line 49. The final spent air passes through the overhead line 50 connected at one end to the top of the storage vessel 48 and passes at the other end to a scrubber vessel 51 filled with water. The air in the scrubber vessel 51 passes to the atmosphere through line 52. The air scrubbing water is discharged as desired through the drain 53 provided at the bottom of the scrubber vessel 51.

In employing the foregoing apparatus to effect the oxidation of a petroleum distillate to produce the desired higher aliphatic ethers, the reactor 10 is filled to about ⅔ full with a suitable petroleum distillate such as, for example, a refined gas oil or an oil rich in normal saturated hydrocarbons through line 19. Steam is applied to the jacket 11 to heat the petroleum distillate up to a temperature of about 118° C. The catalyst chamber 30 has been charged with a suspension of freshly prepared manganese hydroxide in water using a proportion of one gram of manganese and 20 mm. of water for each 1000 grams of gas oil. The turbomixer 17 is set into operation and is driven by means of the motor 18 at approximately 1000 revolutions per minute. Air passes from the compressor through line 21 and through the rotometer 22 which is so controlled as to pass 40 liters per minute of air for 1000 grams of gas oil.

The first charge of catalyst is now slowly introduced together with the air through the regulating valve 31 while maintaining the catalyst feedline valve 32 closed and the valve 29 of by-pass line 27 fully open. Hourly a sample is taken from the reactor 10 and the saponification index of the sample is determined. As soon as the saponification index rises to one or above thereby indicating the starting of the oxidation reaction, more catalyst is added every hour using the same quantity per hour as that for the initial catalyst charge. At the beginning of the reaction or the introduction period thereof, the reaction temperature of 118° C. has to be maintained by means of the steam jacket 11, but once the exothermic reaction of the material starts, the reactor 10 has to be cooled through the cooling coil 14. The reaction is interrupted when the saponification index reaches about 50 and a sample taken therefrom, when cooled to 0° C., shows good crystallization. Under these conditions, the reaction period has taken about 8 to 9 hours. The oxidized mass is drained from the reactor 10 through drain line (not shown) and allowed to cool. The cooling of the oxidized mass results in a separation of the spent catalyst together with some oxidized oil which is insoluble in the total mass. The oil containing the ethers is decanted and saponified with 10% caustic soda solution and filtered at 0 to 10° C. The resulting filtered cake will be found to consist principally of saturated di-aliphatic ethers having a melting point from 20° to 50° C., which can be further purified by recrystallization or similar methods as hereinbefore enumerated.

The foam breaker 34 is heated by steam to above 100° C. in order to drop back into the reactor any oil which splashes up, especially at the end of the reaction when the oil becomes viscous. The condensate which accumulated through the water cooler 39 and in the storage vessel 41 is drained every hour with the oily condensate collected therefrom being separated from the acid water and returned to the reaction chamber. The condensate accumulating as a result of passage through the cooling tower 44 and in the storage vessel 48 is drained at the end of the reaction with a recovered condensate consisting primarily of a small quantity of dilute acid water.

Illustrative examples of the oxidation of a particular petroleum distillate and the results accruing therefrom are as follows:

*Example 1*

The raw material is a gas oil derived by straight-run distillation of Mexican Poza-Rica crude oil. It was prepared for the oxidation by treating it with 10% by volume of concentrated sulphuric acid followed by extraction with 2 portions of 20% each by volume of methanol and finishing by percolation through a decolorizing earth. The treated product had a density $D_4^{20}$ of 0.8376 and a refractive index of $N_D$ of 1.4650. 830 g. of this oil were oxidized in an aluminum vessel provided with a high speed stirrer and reflux condenser under the following conditions: temperature 115–118° C., air supply 40 liters per minute, catalyst 1 g. Mn as manganese sulphate dissolved in 20 ml. $H_2O$ were added at the start and 6 hours were required to induce the reaction. From the seventh to the twelfth hour 1 g. Mn in the form of the described manganese sulphate solution were added each hour. After cooling the reactor was discharged and 791 g. of oxidized oil were obtained. This oil was saponified with NaOH solution of 10% concentration to remove the small quantity (7.8 g.) of acids formed and after separating the soap solution, the oil was cooled and filtered at 0° C. yielding 73.6 g. of colorless ethers with a melting point of 30° C.

*Example 2*

The gas oil mentioned in Example 1 was treated with a concentrated solution of urea in water, the crystals formed were filtered and after washnig with benzene were dissociated with water at 55° C. The excess benzene was distilled off and the oil representing 40% by volume of the original gas oil was treated with 4 portions each of 5% oleum (concentration 104%) and 1 final portion of 5% sulphuric acid (96%). After percolation through a decolorizing earth, the treated oil represented 28% by volume of the original gas oil and had a density of $D_4^{20}$ of 0.803 and a refractive index of $N_D$ 1.448. 320 g. of this oil were oxidized with air under the following conditions: temperature 115–118° C., air supply 4 liters per minute, catalyst 5 g. zinc-stearate at the start and each hour 0.03 g. Mn. $SO_4 \cdot H_2O$ and 0.15 ml. of a solution containing 10% MnOH to form $Mn(OH)_2$ in the reactor. The oxidation was carried on for 8 hours. After cooling the reactor was discharged and 286 g. of oxidized oil were obtained. This oil was saponified with a 10% caustic soda solution to remove 32.9 g. acids formed and after separating the soap solution, the oil was cooled and filtered at 0° C., yielding 75.7 g. of colorless crystallized esters with a melting point of 29.5° C.

From the foregoing, it is to be observed that it is not only possible to obtain higher aliphatic ethers in good yields, but it is also possible to obtain, in addition thereto, fatty acids in reasonably good yield. Moreover, it is to be understood that the aliphatic ethers resulting from the present invention may be recovered in the form of a single ether or mixtures thereof. Similarly, it is to be understood that the ethers may be employed in the form of reaction products with no final purification to obtain ethers in a pure state being required.

The products resulting from the present invention are extremely stable to the same extent as saturated hydrocarbons and are not attacked by strong acids or alkalis or permanganate solution. The compounds have been found to easily penetrate the skin leaving a very smooth complexion thereon, and as a result will be found to be of particular utility in the production of cosmetics. Moreover, as a result of the high boiling point possessed by the ethers prepared in accordance with the present invention, such products will be found to be excellent plasticizers for various synthetic resins.

While there have been described herein what are at present considered preferred embodiments of the invention, it will be obvious to those skilled in the art that modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

I claim:

1. The method of preparing a reaction product containing higher aliphatic ethers comprising reacting a gaseous oxidizing medium air, oxygen and ozone with a petroleum distillate rich in saturated aliphatic hydrocarbons in the presence of a fluid inorganic catalyst selected from the group consisting of metal salts and metal hydroxides at a pressure of between about 20 mm. Hg and 100 p.s.i., at a temperature of between about 80 to 150° C., for a period of time from about 4 to 24 hours, cooling the resulting oxidized distillate to a temperature of at least about 0° C., and recovering the product therefrom.

2. The method of preparing a reaction product containing higher aliphatic ethers comprising reacting a gaseous oxidizing medium selected from the group consisting of air, oxygen and ozone with gas oil in the presence of a fluid inorganic catalyst selected from the group consisting of metal salts and metal hydroxide at a pressure of between about 20 mm. Hg and 100 p.s.i. at a temperature of between about 80 to 150° C., for a period of time from about 4 to 24 hours, cooling the resulting oxidized distillate to a temperature of at least about 0° C., and recovering the product therefrom.

3. The method of preparing a reaction product containing higher aliphatic ethers comprising reacting the gaseous oxidizing medium selected from the group consisting of air, oxygen and ozone with kerosene in the presence of a fluid inorganic catalyst selected from the group consisting of metal salts and metal hydroxides at a pressure of between about 20 mm. Hg. and 100 p.s.i., at a temperature of between about 80 to 150° C., for a period of time from about 4 to 24 hours, cooling the resulting oxidized distillate to a temperature of at least about 0° C., and recovering the product therefrom.

4. The method of preparing a reaction product containing higher aliphatic ethers comprising reacting a gaseous oxidizing medium selected from the group consisting of air, oxygen and ozone with a petroleum distillate rich in saturated aliphatic hydrocarbons in the presence of a fluid inorganic catalyst selected from the group consisting of metal salts and metal hydroxides at a pressure of between about 20 mm. Hg and 100 p.s.i., at a temperature of between about 110 to 118° C., for a period of time from about 4 to 12 hours, cooling the resulting oxidized distillate to a temperature of at least about 0° C., and recovering the product therefrom.

5. The method of preparing a reaction product containing higher aliphatic ethers comprising reacting a gaseous oxidizing medium selected from the group consisting of air, oxygen and ozone with a petroleum distillate rich in saturated aliphatic hydrocarbons in the presence of a fluid inorganic catalyst selected from the group consisting of metal salts and metal hydroxides at a pressure of about 580 mm. pressure, at a temperature of between about 100 to 150° C., for a period of time from about 4 to 12 hours, cooling the resulting oxidized distillate to a temperature of at least about 0° C., and recovering the product therefrom.

6. The method of preparing a reaction product containing higher aliphatic ethers comprising reacting a gaseous oxidizing medium selected from the group consisting of metal salts and metal hydroxides with a petroleum distillate rich in saturated aliphatic hydrocarbons in the presence of a fluid inorganic catalyst selected from the group consisting of metal salts and metal hydroxides at a pressure of about 580 mm. pressure, at a temperature of between about 110 to 118° C., for a period of time from about 4 to 12 hours, cooling the resulting oxidized distillate to a temperature from between about 0° C. to −20° C., and recovering the product therefrom.

7. The method of preparing a reaction product containing higher aliphatic ethers comprising reacting a gaseous oxidizing medium selected from the group consisting of air, oxygen and ozone with a gas oil in the presence of a fluid inorganic catalyst selected from the group consisting of metal salts and metal hydroxides at a pressure of between about 20 mm. Hg and 100 p.s.i., at a tempearture of between about 80 to 150° C., and for a period of time from about 4 to 24 hours, recovering fatty acids from the oxidized petroleum distillate, cooling the remaining oxidized distillate to a temperature of at least about 0° C., and recovering the product therefrom.

8. The method of preparing a reaction product containing higher aliphatic ethers comprising reacting air with a petroleum distillate rich in saturated aliphatic drocarbons in the presence of manganese hydroxide at a pressure of between about 20 mm. Hg and 100 p.s.i., at a temperature of between about 80 to 150° C., for a period of time from about 4 to 24 hours, cooling the resulting oxidized distillate to a temperature of at least about 0° C., and recovering the product therefrom.

9. The method of preparing a reaction product containing higher aliphatic ethers comprising reacting air with a petroleum distillate rich in saturated aliphatic hydrocarbons in the presence of manganese sulphate at a pressure of between about 20 mm. Hg and 100 p.s.i., at a temperature of between about 80 to 150° C., for a period of time from about 4 to 24 hours, cooling the resulting oxidized distillate to a temperature of at least about 0° C., and recovering the product therefrom.

10. The method of preparing a reaction product containing higher aliphatic ethers comprising reacting air with a petroleum distillate rich in saturated aliphatic hydrocarbons in the presence of manganese chloride at a pressure of between about 20 mm. Hg and 100 p.s.i., at a temperature of between about 80 to 150° C., for a period of time from about 4 to 24 hours, cooling the resulting oxidized distillate to a temperature of at least about 0° C., and recovering the product therefrom.

No references cited.